United States Patent
Murakawa

(10) Patent No.: US 8,510,856 B2
(45) Date of Patent: Aug. 13, 2013

(54) IMAGE PROCESSING DEVICE, CONTROL METHOD THEREOF AND COMPUTER PROGRAM PRODUCT

(75) Inventor: Akira Murakawa, Toyonaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 1404 days.

(21) Appl. No.: 11/350,069

(22) Filed: Feb. 9, 2006

(65) Prior Publication Data
US 2006/0256370 A1   Nov. 16, 2006

(30) Foreign Application Priority Data
May 10, 2005 (JP) ................................. 2005-137641

(51) Int. Cl.
*H04L 29/06* (2006.01)
(52) U.S. Cl.
USPC ........... 726/28; 726/2; 726/3; 726/16; 726/31
(58) Field of Classification Search
USPC ............... 713/170, 182; 726/16, 28, 31, 2–4, 726/17
See application file for complete search history.

(56) References Cited

U.S. PATENT DOCUMENTS

| | | | | |
|---|---|---|---|---|
| 5,077,795 A | * | 12/1991 | Rourke et al. | 380/55 |
| 6,208,379 B1 | * | 3/2001 | Oya et al. | 348/211.11 |
| 6,684,210 B1 | * | 1/2004 | Takechi et al. | 1/1 |
| 7,373,662 B2 | * | 5/2008 | Foster et al. | 726/21 |
| 2003/0167336 A1 | * | 9/2003 | Iwamoto et al. | 709/229 |
| 2005/0002057 A1 | * | 1/2005 | Oe | 358/1.15 |
| 2005/0055552 A1 | * | 3/2005 | Shigeeda | 713/171 |
| 2005/0091372 A1 | * | 4/2005 | Nagao | 709/224 |
| 2006/0048234 A1 | * | 3/2006 | Imaizumi et al. | 726/27 |

FOREIGN PATENT DOCUMENTS

| | | |
|---|---|---|
| JP | 2003-196446 A | 7/2003 |
| JP | 2003-323411 | 11/2003 |
| JP | 2003-345896 A | 12/2003 |
| JP | 2004-70416 | 3/2004 |

OTHER PUBLICATIONS

The official communication from the JPO, Notification of Reasons of Refusal and translation thereof.

* cited by examiner

*Primary Examiner* — Justin T Darrow
(74) *Attorney, Agent, or Firm* — Buchanan Ingersoll & Rooney PC

(57) ABSTRACT

An image forming device is provided with a use permission determining portion, an authentication process requesting portion and a job executing portion. The use permission determining portion performs determination whether or not use of the image processing device should be permitted for a user who wants to use the image processing device. The authentication process requesting portion requests the authentication server via a network to act for the determination when the use permission determining portion cannot perform the determination. The job executing portion performs the image processing of process specifics designated by the user when a determination result indicating that the user can use the image forming device is obtained.

22 Claims, 14 Drawing Sheets

TB1A(TB1)

| USER ID | PASSWORD | COPY RIGHT | SCAN RIGHT | PC PRINT RIGHT | FAX TRANSMISSION RIGHT | BOX RIGHT | ... |
|---|---|---|---|---|---|---|---|
| A001 | 58504 | PRESENCE | PRESENCE | PRESENCE | PRESENCE | PRESENCE | ... |
| A002 | 53235 | PRESENCE | PRESENCE | PRESENCE | ABSENCE | PRESENCE | ... |
| A003 | 60981 | PRESENCE | PRESENCE | ABSENCE | PRESENCE | ABSENCE | ... |
| A004 | 72150 | ABSENCE | PRESENCE | ABSENCE | ABSENCE | ABSENCE | ... |
| A005 | 10593 | PRESENCE | ABSENCE | ABSENCE | ABSENCE | ABSENCE | ... |
| ... | | | | | | | |

| USER ID | PASSWORD | COPY RIGHT | SCAN RIGHT | PC PRINT RIGHT | FAX TRANSMISSION RIGHT | BOX RIGHT | ... |
|---|---|---|---|---|---|---|---|
| B001 | 47002 | PRESENCE | ABSENCE | PRESENCE | PRESENCE | PRESENCE | ... |
| B002 | 50962 | PRESENCE | PRESENCE | PRESENCE | PRESENCE | PRESENCE | ... |
| B003 | 10972 | PRESENCE | PRESENCE | ABSENCE | PRESENCE | ABSENCE | ... |
| B004 | 89701 | PRESENCE | PRESENCE | PRESENCE | PRESENCE | ABSENCE | ... |
| B005 | 18903 | PRESENCE | PRESENCE | PRESENCE | ABSENCE | ABSENCE | ... |
| ... | | | | | | | |

| USER ID | PASSWORD | COPY RIGHT | SCAN RIGHT | PC PRINT RIGHT | FAX TRANSMISSION RIGHT | BOX RIGHT | ... |
|---------|----------|------------|------------|----------------|------------------------|-----------|-----|
| A001 | 58504 | PRESENCE | ABSENCE | ABSENCE | PRESENCE | PRESENCE | ... |
| A003 | 60981 | PRESENCE | ABSENCE | ABSENCE | ABSENCE | PRESENCE | ... |
| A005 | 10593 | PRESENCE | ABSENCE | ABSENCE | ABSENCE | ABSENCE | ... |
| B002 | 50962 | PRESENCE | ABSENCE | ABSENCE | PRESENCE | ABSENCE | ... |
| B005 | 18903 | PRESENCE | PRESENCE | ABSENCE | ABSENCE | ABSENCE | ... |
| ... | ... | ... | ... | ... | ... | ... | ... |

HG1

HG2

IMAGE PROCESSING DEVICE, CONTROL METHOD THEREOF AND COMPUTER PROGRAM PRODUCT

This application is based on Japanese Patent Application No. 2005-137641 filed on May 10, 2005, the contents of which are hereby incorporated by reference.

BACKGROUND OF THE INVENTION

1. Field of the Invention

The present invention relates to an image processing device such as MFP for performing an image-related process about an image and a method for controlling the device.

2. Description of the Prior Art

In recent years image processing devices having functions of a copying machine, a network printer, a scanner, a fax machine, a document server and the like have become commonplace. Such an image processing device is called a multifunction device or multi function peripherals (MFP). Along with its high performance, many users have become to use image processing devices.

Among these users, there are various users including a user who uses only a function of a copying machine, a user who uses only a function of a fax machine and a user who uses only various functions. In other words, there are various levels of usage for users who use image processing devices.

If an image processing device is installed in an office, it is preferable to set use rights (access rights) to be given to users in accordance with attributions such as jobs, titles, and the number of service years or reliability of the user. For example, it is preferable not to give a use right of fax function to a user who does not need to use the fax function. By setting the use rights in this way, leakage of confidential information or the like can be prevented so that security can be improved.

In an organization having plural image processing devices installed in plural locations (for example, a company having plural branch offices), it is necessary to determine whether or not use of the image processing device should be allowed to a user who wants to use it for each image processing device. In addition, considering security, it is preferable to set different use rights given to a user for each image processing device. For example, it is preferable to set use right widely for the image processing device that is installed in the branch office to which the user belongs and narrowly for the image processing device that is installed in the branch office to which the user does not belongs.

In this case, however, it is burdensome work for an administrator to set use rights with increasing the number of image processing devices. It is difficult to reduce the load of the administrator even by using a method for authentication as disclosed in Japanese patent publications Nos. 2003-323411 and 2004-70416, in which plural authentication systems or means are used.

SUMMARY OF THE INVENTION

An object of the present invention is to provide an image processing device and a method for controlling the same that can facilitate setting about use rights of an image processing device that is used in an organization including plural branch offices or the like.

An image processing device according to the present invention is an image processing device for performing an image-related process about an image. The image processing device includes a use permission determining portion for determining whether or not use of the image processing device should be permitted for a user who wants to use the image processing device, a determination request portion for requesting an authentication server via a network to act as the use permission determining portion when the determination by the use permission determining portion cannot be performed, an image-related process control portion for controlling each portion of the image processing device so that the image-related process of process specifics designated by the user can be performed when the use permission determining portion or the authentication server determines that the user can use the image processing device. In other words, internal authentication is performed with higher priority, and external authentication is performed when the internal authentication is disabled.

Alternatively, it is possible to configure that the authentication server performs the determination (external authentication) with higher priority, and the image processing device acts as the authentication server (performs internal authentication) when the authentication server cannot perform the determination. Alternatively, it is possible to set which of the internal authentication and the external authentication is performed with higher priority for each user. The use right information that is used for the determination by the image processing device and the use right information that is used for the determination by the authentication server are preferably set differently corresponding to users or environments of the image processing devices even if they are for the same user.

According to the present invention, the image processing device makes the authentication server act as the same when it cannot determine whether or not the user can use the image processing device. Therefore, it is not necessary to register an access right of an irregular user (e.g., a visitor on business) who does not use the image processing device regularly in the image processing device. Thus, it is possible to perform more simply the setting of use rights of the image processing device that is used in an organization having plural branch offices or the like.

According to the present invention, the image processing device lets the authentication server perform determination whether a user can use the image processing device itself, and the image processing device itself performs the determination only when the authentication server cannot perform the determination. Thus, the determination can be performed even if the authentication server or the network is out of order or other trouble occurs so that communication with the authentication server is impossible.

BRIEF DESCRIPTION OF THE DRAWINGS

FIG. 6 is a diagram showing an example of a user-specific access right table.

FIG. 7 is a diagram showing an example of a user-specific access right table.

DESCRIPTION OF THE PREFERRED EMBODIMENTS

Hereinafter, the present invention will be explained more in detail with reference to embodiments and drawings.

Figure 1:
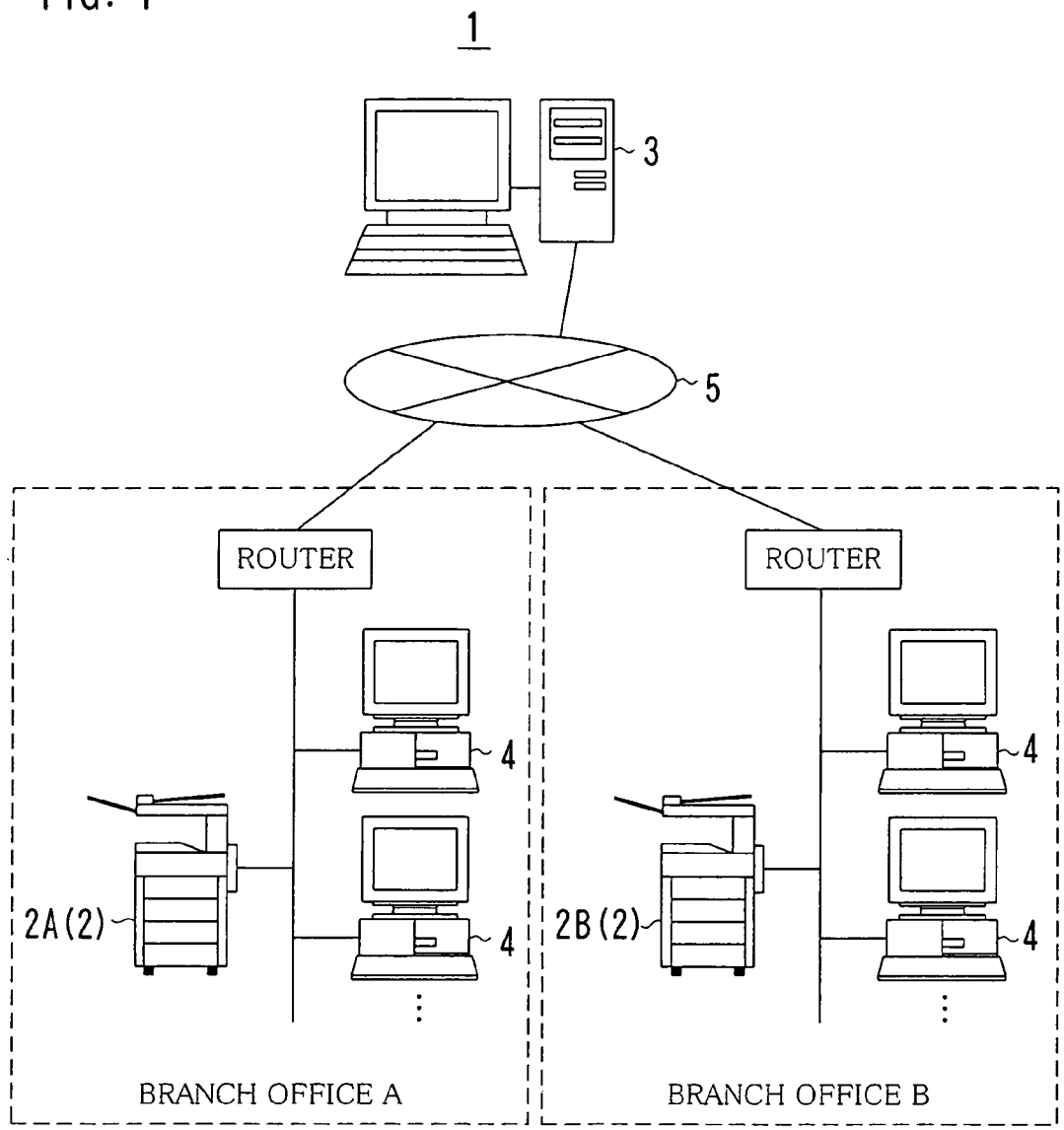
FIG. 1 is a diagram showing an example of an overall structure of an image processing system.
Figure 2:
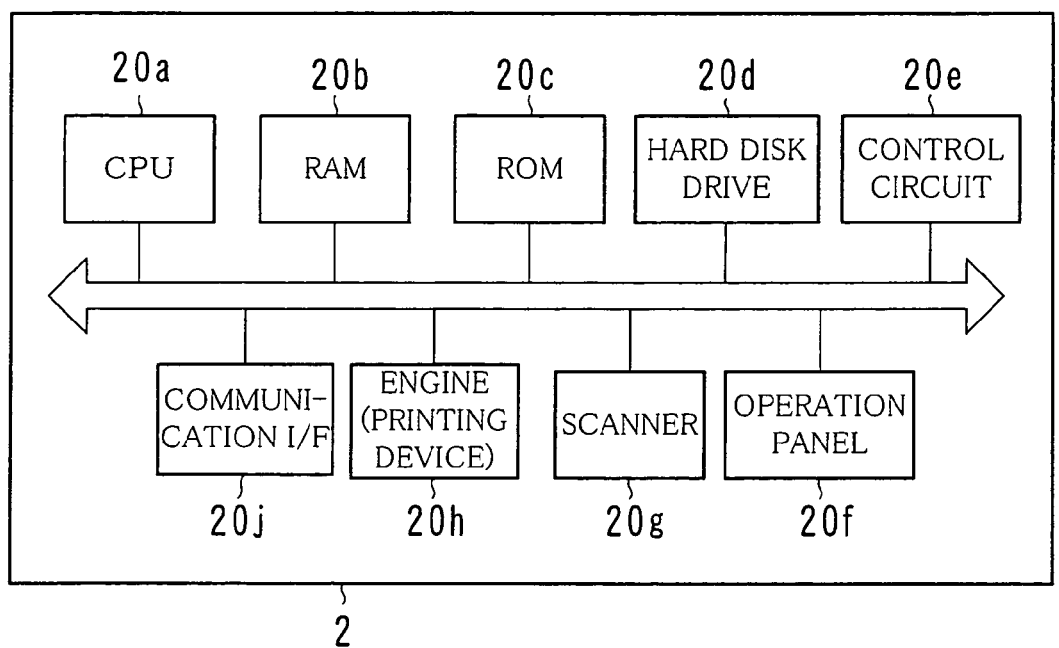
FIG. 2 is a diagram showing an example of a hardware structure of an image forming device.
Figure 3:
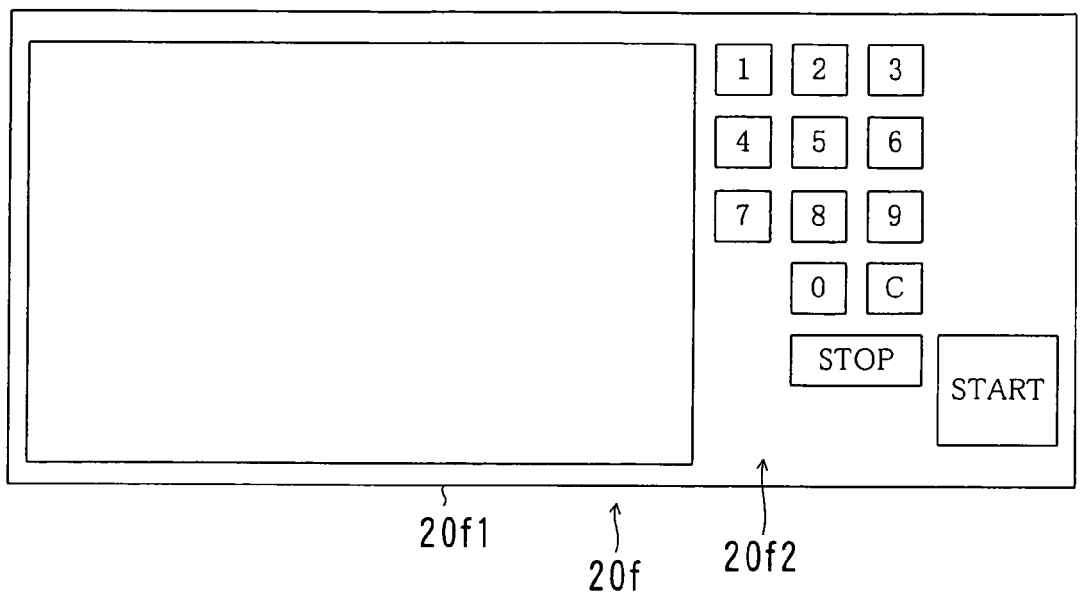
FIG. 3 is a diagram showing an example of a structure of an operation panel.
Figure 4:
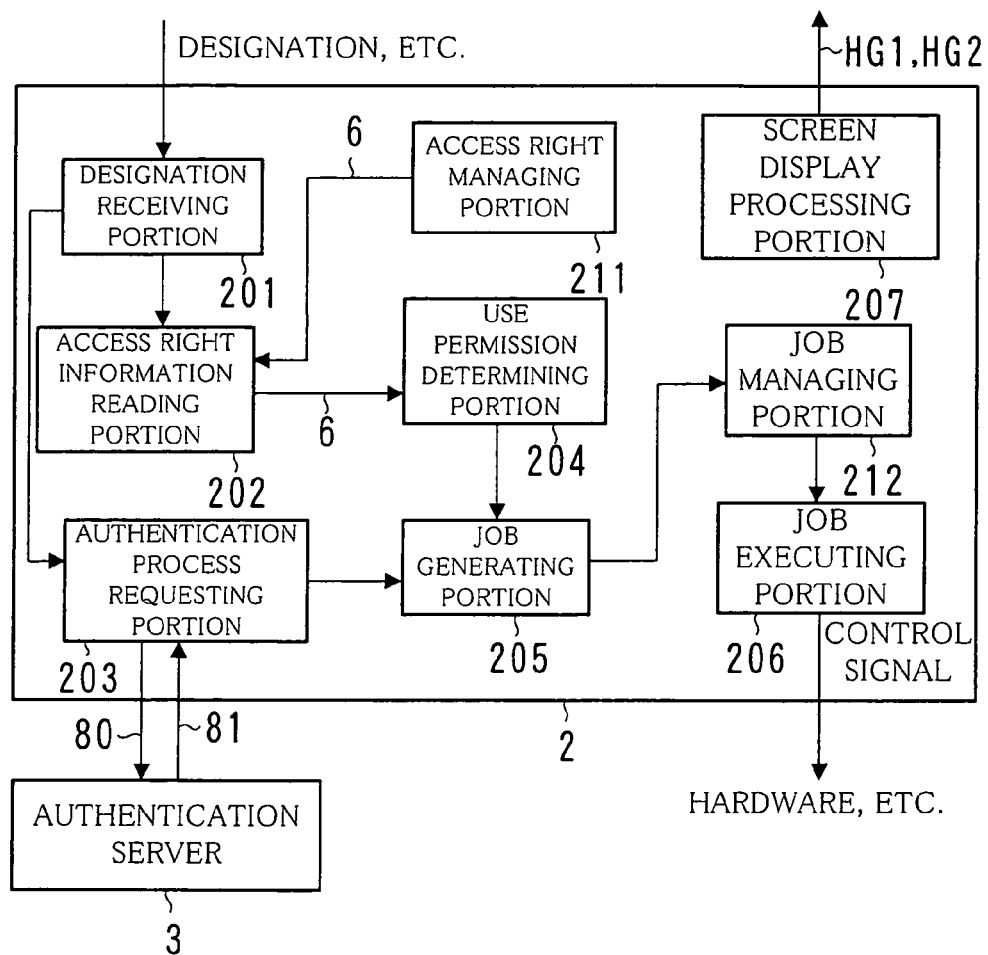
FIG. 4 is a diagram showing an example of a functional structure of the image forming device.
Figure 5:
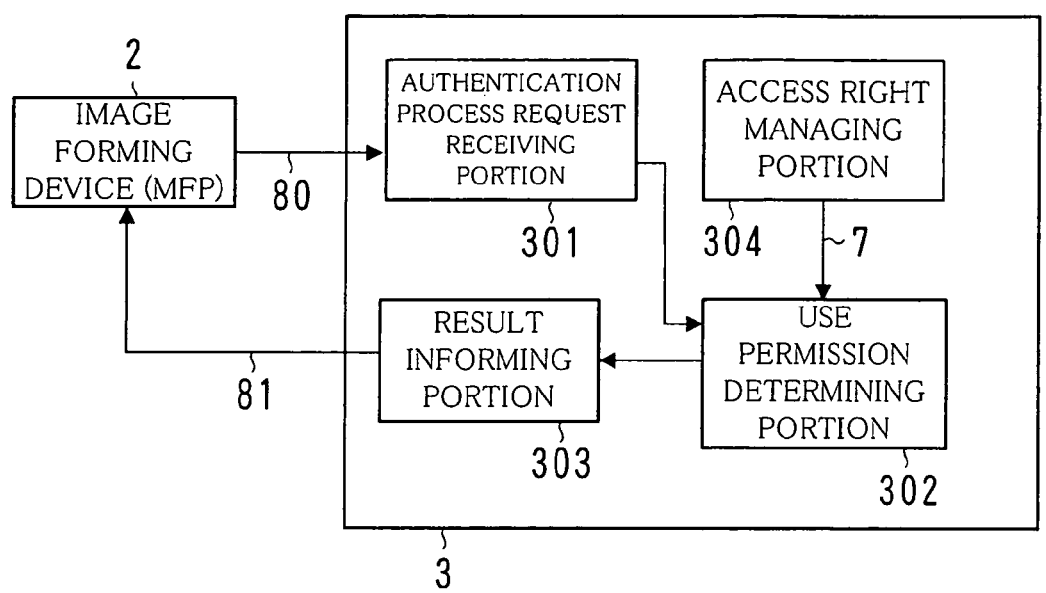
FIG. 5 is a diagram showing an example of a functional structure of an authentication server.

FIG. 1 is a diagram showing an example of an overall structure of an image processing system 1, FIG. 2 is a diagram showing an example of a hardware structure of an image forming device 2, FIG. 3 is a diagram showing an example of a structure of an operation panel 20f, FIG. 4 is a diagram showing an example of a functional structure of the image forming device 2, and FIG. 5 is a diagram showing an example of a functional structure of an authentication server 3.

The image processing system 1 includes plural image forming devices 2 (2A, 2B, . . . ), an authentication servers 3, terminal devices 4, a communication line 5 as shown in FIG. 1. The image forming devices 2, the authentication server 3 and the terminal devices 4 are connected to each other via the communication line 5. As the communication line 5, the Internet, an intranet, a public telephone line or a private line can be used.

An IP address or a host name is assigned to each of the image forming device 2, the authentication server 3 and the terminal devices 4. When host names are used, the image processing system 1 is provided with a DNS (Domain Name System) server.

The image forming device 2 is an image processing device that has integrated functions of a copy machine, a scanner, a fax machine, a network printer, a document server and the like. It is also called a multifunction device or multi function peripherals (MFP). The "network printing" is a function for receiving image data from the terminal device 4 and printing the image on paper. It is also called a "network printer function" or a "PC print function". The "document server" is a function of assigning to each user a storage area that is called a "box" or a "personal box" and corresponds to a folder or a directory in a personal computer, so that each user can store document data such as an image file in his or her storage area. It is also called a "box function".

As shown in FIG. 2, the image forming device 2 includes a CPU 20a, a RAM 20b, a ROM 20c, a hard disk drive 20d, a control circuit 20e, an operation panel 20f, a scanner 20g and a printing device 20h.

The scanner 20g is a device for optically reading an image including photographs, characters, pictures and charts on a sheet of an original (hereinafter sometimes referred to as an "original" simply) and producing image data.

The printing device 20h is a device for printing an image read by the scanner 20g or an image of image data sent from the terminal device 4 or the like on paper in accordance with designation by a user.

The operation panel 20f is made up of a display 20f1 and an operation button unit 20f2 including plural operation buttons as shown in FIG. 3.

The operation button unit 20f2 is made up of plural keys for entering numbers, characters or signs, a sensor for recognizing a pressed key, and a transmission circuit for transmitting a signal indicating a recognized key to the CPU 20a.

The display 20f1 displays a screen for giving a message or an instruction to a user who operates this image forming device 2, a screen for the user to enter a desired type of process and process conditions, and a screen for showing an image formed by the image forming device 2 and a process result. In this embodiment, a touch panel is used for the display 20f1. Therefore, the display 20f1 has a function of detecting a position on the touch panel where a user touches with a finger, and a function of sending a signal indicating a detection result to the CPU 20a.

As described above, the operation panel 20f plays a role as a user interface for a user who operates the image forming device 2 directly. Note that an application program and a driver for instructing the image forming device 2 are installed in the terminal device 4. Therefore, the user can also operate the image forming device 2 from a remote location by using the terminal device 4.

A communication interface 20j is shown in FIG. 2, which is an NIC (Network Interface Card) or a modem for communicating with other devices.

The control circuit 20e is a circuit for controlling devices including the hard disk drive 20d, the scanner 20g, the printing device 20h, the communication interface 20j and the operation panel 20f.

The hard disk drive 20d stores a program and data for realizing functions including a designation receiving portion 201, an access right information reading portion 202, an authentication process requesting portion 203, a use permission determining portion 204, a job generating portion 205, a job executing portion 206, a screen display processing portion 207, an access right managing portion 211 and a job managing portion 212 as shown in FIG. 4. These programs are loaded to the RAM 20b as necessary, and the CPU 20a executes the program. It is possible to store a part or a whole of the program or the data in the ROM 20c. It is also possible to realize a part or a whole of the functions shown in FIG. 4 by the control circuit 20e.

The authentication server 3 is a server that performs authentication of a user who uses the image forming device 2 or the terminal device 4 provided to the image processing system 1. A hard disk drive of the authentication server 3 stores a program and data for realizing functions of an authentication process request receiving portion 301, a use permission determining portion 302, a result informing portion 303 and an access right managing portion 304 as shown in FIG. 5. The program and the data are loaded to a RAM as required and a CPU executes the program. The authentication server 3 may be a server machine to which an authentication service such as Active Directory of Microsoft Corporation or Novell Directory Service (NDS) of Novell Inc. and NTLM authentication (Windows NT LAN manager authentication) are applied, for example.

An application program and a driver supporting the image forming device 2 are installed in the terminal device 4 as described above. As the terminal device 4, a personal computer, a workstation or a PDA (Personal Digital Assistant) can be used.

Figure 8:
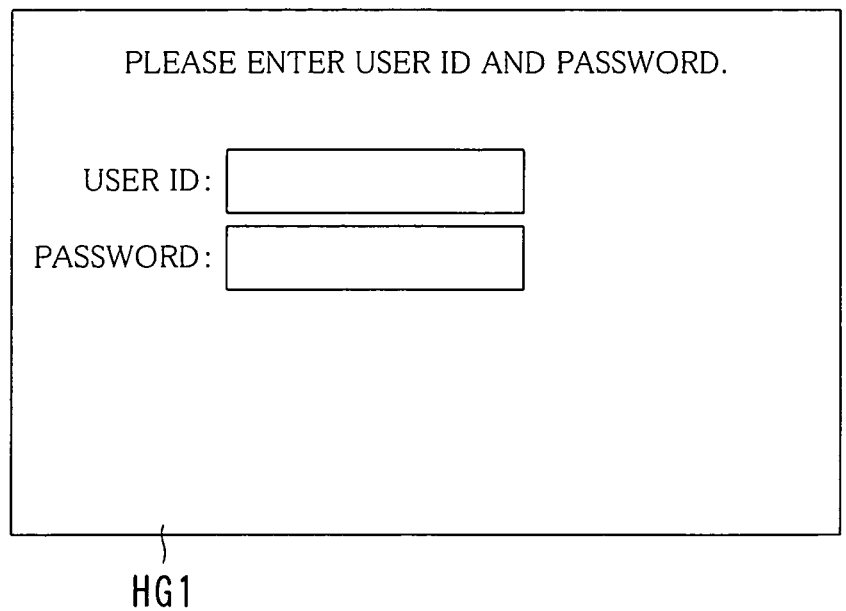
FIG. 8 is a diagram showing an example of a log in screen.
Figure 9:
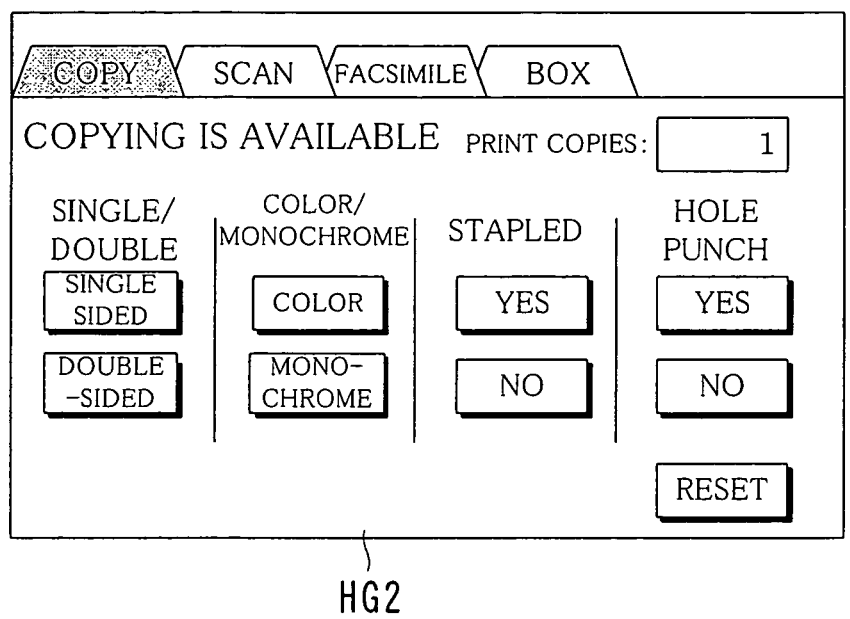
FIG. 9 is a diagram showing an example of a process designation screen.

FIG. 6 is a diagram showing an example of a user-specific access right table TB1, FIG. 7 is a diagram showing an example of a user-specific access right table TB2, FIG. 8 is a diagram showing an example of a log in screen HG1, and FIG. 9 is a diagram showing an example of a process designation screen HG2.

Next, process specifics and the like of each portion of the image forming device 2 shown in FIG. 4 and each portion of the authentication server 3 shown in FIG. 5 will be described in detail with reference to an example of the case where the image processing system 1 is applied to a company X that includes two branch offices, i.e., branch office A and branch office B. Note that it is supposed that the image forming device 2A is placed in the branch office A and the image forming device 2B is placed in the branch office B as the image forming device 2.

As shown in FIG. 4, the access right managing portion 211 of the image forming device 2 stores and controls the user-specific access right table TB1. This user-specific access right table TB1 stores access right information 6 of each employee (user) who belongs to the branch office where the image forming device 2 is placed. Therefore, the image forming devices 2A and 2B have the user-specific access right table TB1 of different specifics. For example., the image forming device 2A has the user-specific access right table TB1A as shown in FIG. 6(*a*), while the image forming device 2B has the user-specific access right table TB1B as shown in FIG. 6(*b*).

Hereinafter, the access right information 6 of each employee in the branch office A that is stored in the user-specific access right table TB1A may be referred to as "access right information 6A", and the access right information 6 of each employee in the branch office B that is stored in the user-specific access right table TB1B may be referred to as "access right information 6B".

In the access right information 6, the "user ID" is identification information for discriminating the employee (user) to whom the access right information 6 is assigned from other employees, and it is used as a user account. The "password" is a keyword that only the employee to whom the user ID is assigned can know for confirming whether or not the employee is an authorized user.

The "copy right" through the "box right" in FIGS. 6(*a*) and 6(*b*) are information about use restriction or access right of each function whether or not each function of the image forming device 2 can be used.

The "copy right" indicates permission or inhibition of using a copy function that is a function of copying an original to paper. If a set value of the copy right is "presence", it means that a use right of the copy function is given to the user. If a set value of the copy right is "absence", it means that the use right of the function is not given to the user. The meaning of "presence" and the meaning of "absence" are the same for use rights of other functions that will be described below.

The "scan right" indicates permission or inhibition of using a scan function that is a function of reading an image of an original so that image data (electronic data) are generated. The "PC print right" indicates permission or inhibition of using a function of printing out an image prepared in the terminal device 4 from the image forming device 2. The "fax transmission right" indicates permission or inhibition of using a fax transmission function that is a function of transmitting fax data to a fax terminal outside the image processing system 1. The "box right" indicates permission or inhibition of using a box function that is provided to the image forming device 2.

In FIG. 5, the access right managing portion 304 of the authentication server 3 stores and manages the user-specific access right table TB2. The user-specific access right table TB2 stores access right information 7 (71, 72, . . . ) of some employees of the company X as shown in FIG. 7. This access right information 7 has a structure that is the same as the access right information 6 as understood from comparison with FIG. 6.

The access right information 6 or 7 is preferably given to the employee as follows, for example. One piece of the access right information 6 is given to each employee who uses the image forming device 2. This access right information 6 is managed by the image forming device 2 shared by the users. For example, the access right information 6(6A) is given to each employee of the branch office A, and it is stored and managed in the user-specific access right table TB1A. Furthermore, the access right information 7 is given specially to an employee who frequently travels to other branch offices on business, and it is stored and managed in the user-specific access right table TB2 of the authentication server 3. Thus, the employee can also use the image forming device 2 that is placed in the branch office of the travel destination. This mechanism will be described later.

Specifics of the access right information 6 and 7 are determined in accordance with scope of work or a post of the employee and are registered in the user-specific access right table TB1 or TB2 by the administrator operating the image forming device 2 or the terminal device 4.

In FIG. 4, the job managing portion 212 manages job data of jobs in an execution queue. In other words, it manages a job queue.

The screen display processing portion 207 lets the display 20/1 of the operation panel 20*f* display a predetermined screen at a predetermined timing. For example, if nobody logs in the image forming device 2, the log in screen HG1 for entering a user ID and a password is displayed as shown in FIG. 8. In addition, after the user logs in, the process designation screen HG2 or the like is displayed as shown in FIG. 9 in accordance with user's operation or a process result. However, when the user operates the image forming device 2 from a remote place by using the terminal device 4, the screen data are transmitted to the terminal device 4 for performing the display process of the screen.

The designation receiving portion 201 performs a process for receiving designation concerning a user ID or process specifics from an employee (user). For example, in the state where the log in screen HG1 is displayed, it receives a user ID and a password that are designated by the employee who operates the operation panel 20*f*. Alternatively, in the state where the process designation screen HG2 is displayed, it receives employee's desired process specifics designated by the employee who operates the operation panel 20*f*. If the user has logged in the terminal device 4, the designation receiving portion 201 receives designation specifics via the communication line 5.

The access right information reading portion 202 reads out access right information 6 corresponding to the user ID of the employee received by the designation receiving portion 201 from the user-specific access right table TB1 of the image forming device 2 itself (i.e., local one). For example, if a user ID of "A001" is designated for the image forming device 2A, the access right information 6A having a user ID "A001" is read out of the user-specific access right table TB1A (see FIG. 6(*a*)).

The use permission determining portion 204 determines whether or not the employee who designated the user ID is an authorized user in accordance with a password received by the designation receiving portion 201 together with a user ID and a password indicated in the access right information 6 corresponding to the user ID read by the access right information reading portion 202. In other words, if the both passwords are identical, it is determined that the user is an authorized user. Then, the employee has logged in the image forming device 2, and the employee is permitted to use the image forming device 2 within a predetermined right. On the contrary, if they are not identical, the user is refused to log in and use the image forming device 2.

Furthermore, the use permission determining portion 204 also performs determination about use permission of functions of the image forming device 2. This determination process is performed in accordance with process specifics designated by the employee who logged in on the process designation screen HG2 or the like and access right information 6 of the employee read out by the access right information reading portion 202.

For example, if the employee wants the image forming device 2 to perform the process of copying an original, he or she designates process conditions of copy (one-sided copy or double-sided copy, color copy or monochrome copy, with or without stapling, with or without punching, the number of copies, etc.) on the process designation screen HG2 and presses the "START" button of the operation button unit 20*f*2. Then, the instruction of performing the copy process and designation of process conditions are received by the designation receiving portion 201. Here, the use permission determining portion 204 determines whether or not the copy function that is necessary for performing the process is allowed for the employee (the user who logged in) to use in accordance with the access right information 6 of the employee that was read out before. In other words, if a value of "presence" is indicated in the "copy right" of the access right information 6, it is determined the user can use the copy function. On the contrary, if a value of "absence" is indicated, it is determined the user should be refused to use the copy function.

Alternatively, if the employee wants the image forming device 2 to perform the process of scanning an original, he or she presses the "scan" tab on the process designation screen HG2. Then, the screen display processing portion 207 displays a process designation screen for scanning, process conditions for scanning are designated on this screen, and the "START" button is pressed. Then, similarly to the case of copy process, designation of performing the scan process and designation of the process conditions are accepted. Then, the use permission determining portion 204 determines that use of the scan function can be allowed if a value of "presence" is indicated in the "scan right" of the access right information 6. If a value of "absence" is indicated in the same, it is determined that the use should be refused.

In the same manner, if the employee wants to use the fax transmission, he or she presses the "fax" tab so that the process designation screen for the fax transmission is displayed. If the user wants the box management, he or she presses the "box" tab so that the process designation screen for box management is displayed. Then, the "START" button is pressed after designating desired process specifics. Then, the designated specifics or the like are accepted, and the use permission determining portion 204 determines that use of the scan function can be allowed if a value of "presence" is indicated in the "fax transmission right" of the access right information 6. If a value of "presence" is indicated in the "box right", it is determined that use of the box function can be allowed. If a value of "absence" is indicated, it is determined that use of the corresponding function should be refused.

Alternatively, if the employee wants the image forming device 2 to perform the process of a so-called PC print, he or she operates the terminal device 4 so as to give an instruction of execution and designation of process conditions to the image forming device 2. Then, the use permission determining portion 204 determines that use of the PC print function can be allowed if a value of "presence" is indicated in the "PC print right" of the access right information 6 of the employee. If a value of "absence" is indicated, it is determined that the use should be refused.

The job generating portion 205 generates a job of the process when the use permission determining portion 204 determines that use of the function necessary for performing the process desired by the employee can be allowed. The generated job is registered in the queue of the job managing portion 212 for waiting an order of execution start.

The job executing portion 206 controls each portion of the image forming device 2 so that the jobs registered in the queue are executed sequentially in accordance with the process conditions designated by the employee in the same manner as the conventional system.

If the access right information 6 corresponding to the user ID accepted by the designation receiving portion 201 is not stored in the local user-specific access right table TB1, the access right information reading portion 202 cannot read out the access right information 6. Therefore, the use permission determining portion 204 cannot perform the determination process about the use permission of the image forming device 2. For example, the use permission determining portion 204 of the image forming device 2A in the branch office A cannot perform the determination process for an employee who belongs to the branch office B.

Therefore, the authentication process requesting portion 203 requests the authentication server 3 to perform the determination process in this case. On this occasion, the authentication process requesting portion 203 sends to the authentication server 3 determination request information 80 that indicates which determination process should be performed.

For example, if the access right information 6 corresponding to the user ID entered by the employee on the log in screen HG1 shown in FIG. 6 is not present, the authentication process requesting portion 203 sends the determination request information 80 indicating the user ID, the password entered together with the user ID and the instruction of determining whether or not it is an authorized user (i.e., the instruction of executing the user authentication). Alternatively, if the employee operates for the copy process, the determination request information 80 is sent that indicates the user ID of the employee and the instruction that the use permission or refusal of the copy function should be determined.

In FIG. 5, the authentication process request receiving portion 301 of the authentication server 3 receives the determination request information 80 from the image forming device 2 and accepts the request that the determination process should be performed.

The use permission determining portion 302 performs the following determination process in accordance with the specifics of the received determination request information 80.

If the determination request information 80 indicates an instruction of determining whether or not the user is an authorized user (authentication) together with a user ID and a password, the access right information 7 corresponding to the user ID is read out of the user-specific access right table TB2 first. The password indicated in the received determination request information 80 is compared with the password indicated in the read access right information 7. If they are identical, it is determined that the user is an authorized user. If they are not identical, it is determined that the user is an unauthorized user.

Alternatively, if the determination request information 80 indicates an instruction of determining use permission or refusal of a function together with a user ID, the access right information 7 corresponding to the user ID is read out of the user-specific access right table TB2 so that use permission or refusal of the function is determined. A method for the determination is the same as the case of the use permission determining portion 204 described above. In other words, when use permission or refusal of the copy function is determined for example, it is determined that the use can be allowed if a value of "presence" is indicated in "copy right" of the read access right information 7. If a value of "absence" is indicated in the same, it is determined that the use should be refused.

The result informing portion 303 sends determination result information 81 indicating a determination result by the use permission determining portion 302 to the image forming device 2 that made the request.

Then, if the determination result information 81 indicating that the user is an authorized user is received from the authentication server 3, the image forming device 2 authenticates the employee who entered the user ID on the log in screen HG1 shown in FIG. 6, who is allowed to log in and to use the image forming device 2. Alternatively, if the determination result information 81 indicating that the use of the function of the image forming device 2 can be allowed is received, the image forming device 2 generates a job of the process designated by the employee (who logged in) and registers the same in the queue.

Figure 10:
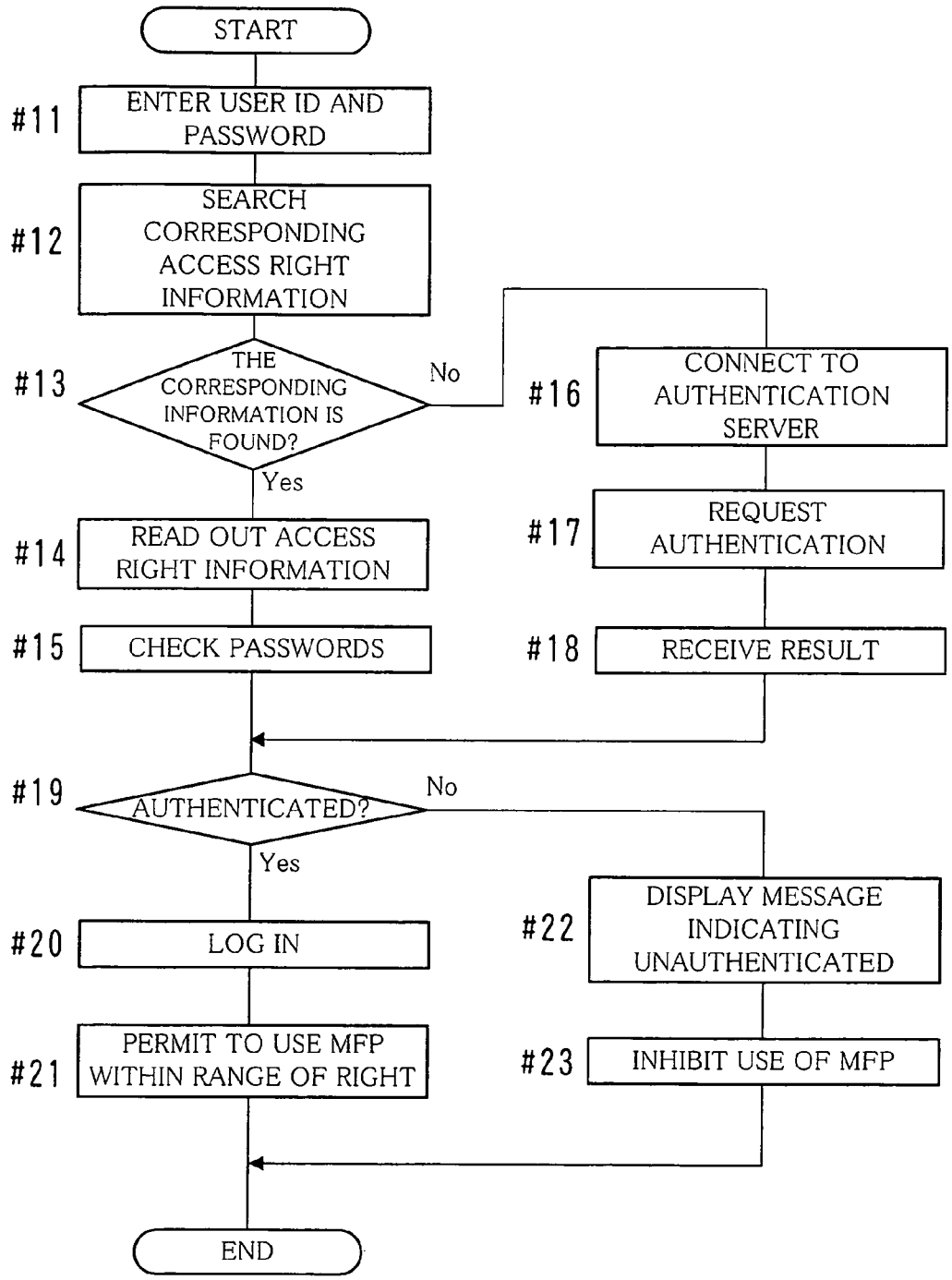
FIG. 10 is a flowchart showing an example of a flow of a process for logging in the image forming device.
Figure 11:
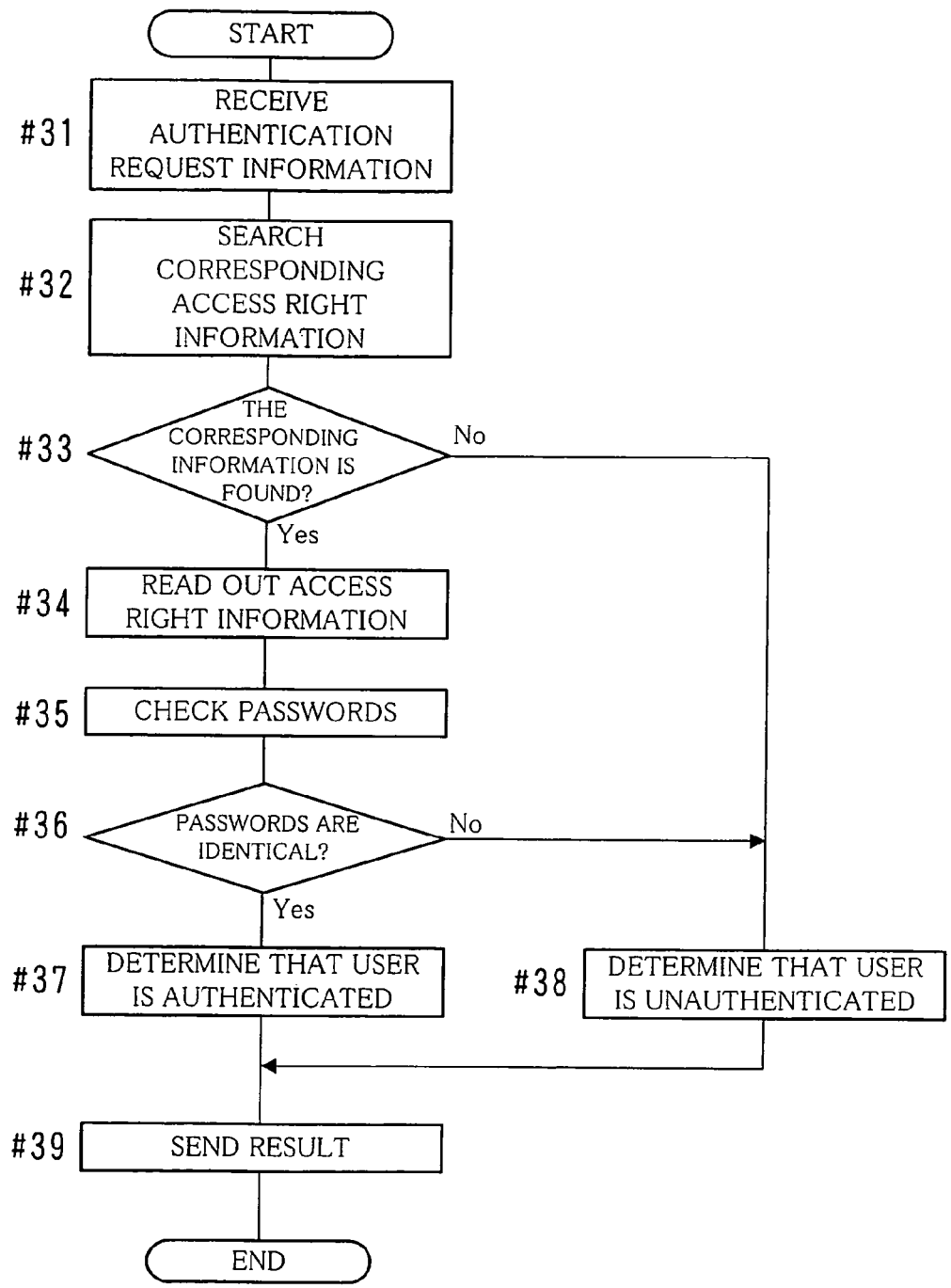
FIG. 11 is a flowchart showing an example of a flow of a user authentication process in the authentication server.
Figure 12:
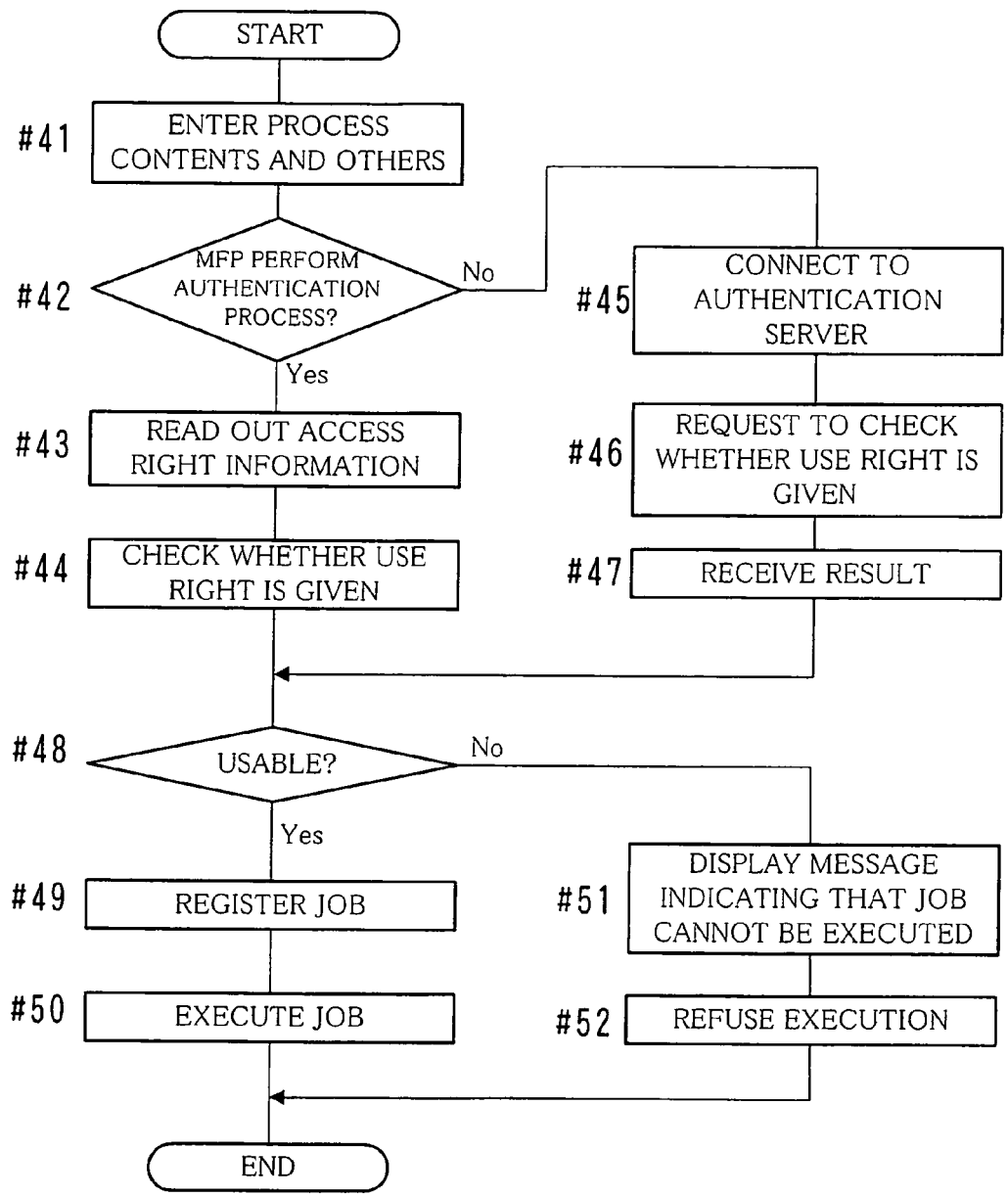
FIG. 12 is a flowchart showing an example of a flow of a use permission determining process about a function in the image forming device.
Figure 13:
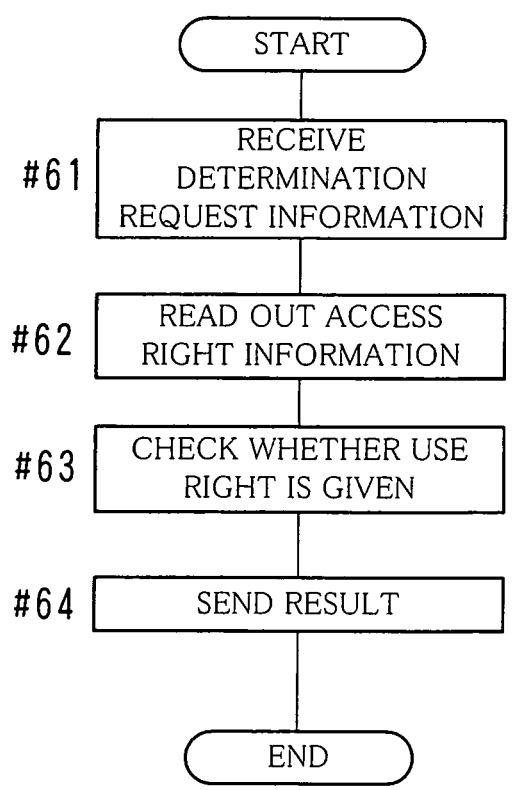
FIG. 13 is a flowchart showing an example of a flow of a use permission determining process about a function in the authentication server.

FIG. 10 is a flowchart showing an example of a flow of a process for logging in the image forming device 2, FIG. 11 is a flowchart showing an example of a flow of a user authentication process in the authentication server 3, FIG. 12 is a flowchart showing an example of a flow of a use permission determining process about a function in the image forming device 2, and FIG. 13 is a flowchart showing an example of a flow of a use permission determining process about a function in the authentication server 3.

Next, a flow of a general process of the image forming device 2 and the authentication server 3 will be described with reference to flowcharts. Here, a flow of the process in the image forming device 2A in the branch office A among the image forming devices 2 that are provided to the image processing system 1 will be described. Note that the controls for processes of the flowcharts described below are performed by CPUs of the image forming device 2 and the authentication server 3, respectively.

In FIG. 10, when an employee who wants to use the image forming device 2A enters his or her user ID and password for designation (#11), the image forming device 2A searches and reads out the access right information 6A corresponding to the user ID from the local user-specific access right table TB1A (see FIG. 6(a)) (#12, Yes in #13, and #14).

The password indicated in the read-out access right information 6A is compared with the password designated in the step #11 (#15). If the both are identical, the employee is authenticated (Yes in #19) so that logging in the image forming device 2A is allowed (#20). Thus, the employee is allowed to use the image forming device 2A within the right that is given to him or her until logging out (#21). If the passwords are not identical (No in #19), a message indicating that the user authentication failed is displayed on the display 20f1 (see FIG. 3) or the terminal device 4, and use of the image forming device 2A is inhibited (#22 and #23).

On the contrary, if the access right information 6A of the employee was not found in the step #12 (No in #13), it is connected to the authentication server 3 (#16) for requesting to act for the user authentication of the employee (#17). More specifically, the user ID and the password designated in the step #11 and the determination request information 80 indicating that the user authentication process should be performed are sent to the authentication server 3.

Then, the authentication server 3 performs the user authentication process in the procedure shown in FIG. 11. When the determination request information 80 is received from the image forming device 2A (#31), the access right information 7 corresponding to the user ID designated in the determination request information 80 is searched and read out from the user-specific access right table TB2 (see FIG. 7) (#32, Yes in #33, and #34). The password indicated in the determination request information 80 is compared with the password indicated in the read access right information 7 (#35). If the both are identical (Yes in #36), it is determined that the employee is an authorized user so that the authentication is given (#37). If the both are not identical (No in #36), the authentication is not given (#38). The authentication is not given also if the access right information 7 corresponding to the user ID is not found (No in #33) (#38).

Then, the authentication server 3 answers the image forming device 2A that made the request by sending a result of the user authentication process (the determination result information 81) (#39).

With reference to FIG. 10 again, the image forming device 2A receives the determination result information 81 from the authentication server 3 (#18). If the determination result information 81 indicates that the user authentication should be given (Yes in #19), use of the image forming device 2A is allowed (#20 and #21). On the contrary, if the determination result information 81 indicates that the user authentication should not be given (No in #19), its message is displayed so that use of the image forming device 2A is inhibited (#22 and #23).

If the employee belongs to the branch office A, the access right information 6A of the employee must be found in the user-specific access right table TB1A of the image forming device 2A in the step #12. In this case, therefore, the image forming device 2A performs the user authentication process. On the contrary, if the employee belongs to a department other than the branch office A, the access right information 6A of the employee is not found because it is not registered in the user-specific access right table TB1A. Therefore, the authentication server 3 performs the user authentication process for the image forming device 2A.

After logging in, the employee can use the image forming device 2A within the range of right that is given to him or her. In FIG. 12, when the image forming device 2A receives designation of process specifics (a type of process and process conditions) desired by the employee who logged in (#41), it determines whether or not the employee has execution right of the process as described below.

If an employee of the branch office A made the designation, the image forming device 2A itself did the user authentication of the employee before. Therefore, the access right information 6A of the employee must be stored in the local user-specific access right table TB1A. Therefore (Yes in #42), the access right information 6A is read out (#43), and it is determined whether or not the use right of the function that is necessary for the process designated by the employee is given to the employee (#44).

On the contrary, if an employee in a department other than the branch office A made the designation (No in #42), the access right information 6A of the employee is not registered locally. Therefore, the image forming device 2A is connected to the authentication server 3 (#45) so as to request the same to act for the determination process in the step #44 (#46).

Then, the authentication server 3 performs the determination process in the procedure as shown in FIG. 13. When the request (determination request information 80) is received from the image forming device 2A (#61), the access right information 7 of the employee is read out of the user-specific access right table TB2 (#62), and it is determined whether the use right of the function that is necessary for the process designated by the employee is given (#63). Then, the determination result is sent to the image forming device 2A (#64).

With reference to FIG. 12 again, if the result indicating that the use right is given to the employee is obtained or received from the authentication server 3 in the step #44 (Yes in #48), the image forming device 2A allows execution of the process of the designation that was accepted in the step #41, and a job of the process is registered in a queue (#49). Then, the process is executed when the job's turn comes (#50). On the contrary, if the result indicating that the use right is not given (No in #48), it is displayed that the process desired by the employee cannot be executed (#51) and the execution is stopped (#52).

In this way, determination of the use permission is performed in the same manner as the case of the user authentication when the user logs in as described above with reference to FIG. 10. If the employee belongs to the branch office A, the image forming device 2A performs the determination. If the employee belongs to a department other than the branch office A, the authentication server 3 acts for the determination. In other words, if the access right information 6A of the employee is stored in the user-specific access right table TB1A of the image forming device 2A, the image forming device 2A performs the determination of the use permission. If it is not stored in the same, the authentication server 3 acts for the determination.

If both of the access right information 6 and 7 are given to the employee, these specifics are preferably set as follows. As described above, the determination about the use right of the image forming device 2 is performed by using the access right information 6 first that is stored in the image forming device 2 locally, and it is performed by using the access right information 7 stored in the authentication server 3 if necessary access right information 6 does not exist. In other words, the access right information 7 is used in a case with special circumstances such as a case where an employee (user) uses the image forming device 2 located in a destination of business trip. Therefore, in order to enhance security by limiting unauthorized operation, it is preferable to set the setting specifics of the access right information 7 more strictly than the setting specifics of the access right information 6. For example, it is preferable to set only rights of functions that are minimum necessary in the destination of the business trip in the access right information 6.

According to this embodiment, it is easy to set access right information of the user who needs to use image forming devices 2 in plural locations like an employee who often goes on business trips. In other words, the access right information 6 is set conventionally concerning the image forming device 2 that the user usually uses. In addition, the access right information 7 is set in the authentication server 3. When the user uses the image forming device 2 on the destination of the business trip, the authentication server 3 performs the user authentication and the like for the image forming device 2 in accordance with the access right information 7. Therefore, it is not necessary for the administrator of the image processing system 1 to set the access right information to the image forming devices 2 in plural locations so that work load is reduced.

It is possible to record usage history of the image forming device 2 (such as information indicating usage date, a type of process, process conditions, or a value of a counter that counts the number of log-in times) for each employee (e.g., business traveler) who was given user authentication by the authentication server 3 instead of the image forming device 2, and to determine that an employee who was given authentication to be an authorized user by the authentication server 3 for a predetermined period or more or a predetermined times or more is a user having high reliability so that the access right information 6 is generated and registered automatically for the employee in the image forming device 2. In addition, it is possible to send this usage history to the authentication server 3 for back up the same at a predetermined timing such as a time point of finishing the job.

In this embodiment, as described above with reference to FIGS. 10-13, the determination process whether or not an employee (a user) can use the image forming device 2 is performed in accordance with the access right information 6 if the employee's access right information 6 is stored locally, i.e., in the user-specific access right table TB1 of the image forming device 2 itself. If it is not stored locally, the authentication server 3 acts for the determination process. In other words, the image forming device 2 performs the determination process with higher priority (internal authentication), and the authentication server 3 acts (external authentication) when the image forming device 2 cannot perform the determination process. The determination process may be performed in a method other than this.

For example, it is possible that the authentication server 3 performs the determination process with higher priority, and the image forming device 2 acts for the determination process when the authentication server 3 cannot perform the same. In this case, the image forming device 2 performs the determination process in the procedure as shown in FIG. 14.

Figure 14:
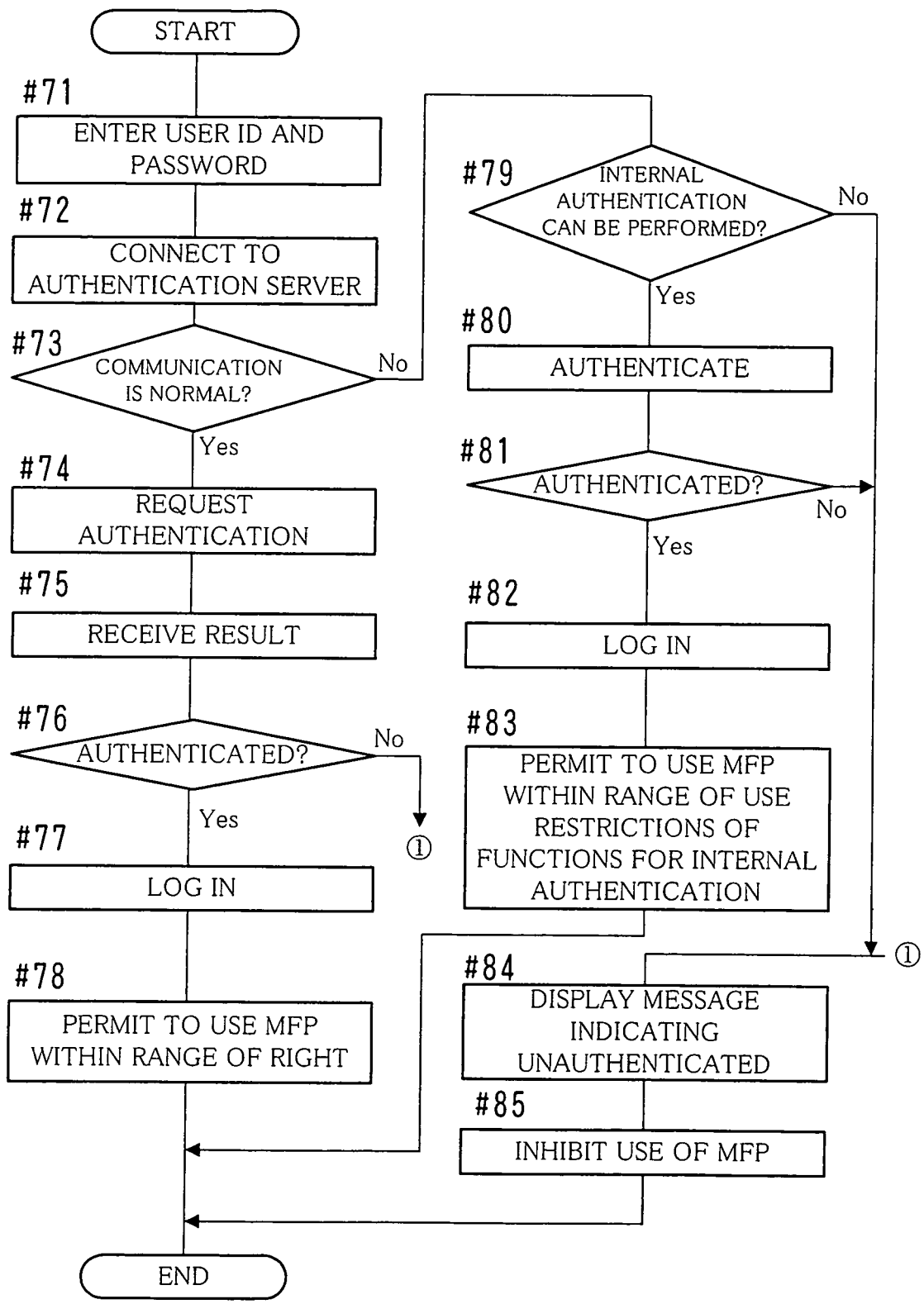
FIG. 14 is a flowchart showing a variation of process for logging in the image forming device.

FIG. 14 is a flowchart showing a variation of process for logging in the image forming device 2.

When the image forming device 2 accepts a user ID and a password of the employee who intends to use the image forming device 2 (#71), it tries to make connection with the authentication server 3 (#72). When the connection succeeds (Yes in #73), it sends the determination request information 80 so as to request the authentication server 3 to determine whether or not the employee is an authorized user (#74). Then, the authentication server 3 performs the user authentication process in the procedure described above with reference to FIG. 11 and sends the result to the image forming device 2 that made the request. Note that, on this occasion, the authentication server 3 performs determination whether or not the user is an authorized user (user authentication) in accordance with the access right information 7 stored in the authentication server 3 itself.

When the image forming device 2 receives the result indicating that the user is an authorized user from the authentication server 3 (#75 and Yes in #76), it allows the employee to log in the image forming device 2 (#77). Thus, the employee is allowed to use the image forming device 2 within the range of right that is given to him or her (#78).

After that, every time when the employee who has logged in tries to perform the process such as copy by the image forming device 2, the image forming device 2 inquires of the authentication server 3 whether or not the employee has an authorized right for performing the process and it determines permission or refusal for performing the process. The authentication server 3 performs the determination process in the procedure that was described above with reference to FIG. 13, and its result is sent to the image forming device 2 that made the request.

On the contrary, if the connection with the authentication server 3 fails (No in #73), the image forming device 2 itself performs the user authentication in accordance with the local access right information 6 (#80). If the authentication succeeds (Yes in #81), the employee is allowed to log in the image forming device 2 (#82). Thus, the employee is allowed to use the image forming device 2 within the range of right that is given to him or her (#83). Then, every time when the employee tries to let the image forming device 2 perform the process such as copy, the image forming device 2 determines whether or not the employee has the right to perform the process in accordance with the access right information 6 for determining permission or refusal of performing the process.

If the user authentication process cannot be performed (No in #79) or if the authentication indicating that the user is an authorized user is not obtained (No in #81), a message indicating the content is displayed (#84) so that use of the image forming device 2 is inhibited (#85).

According to this method, even if the communication with the authentication server 3 is out of order due to a malfunction of the authentication server 3 or a failure of the network, the user can perform the authentication and the like.

When the method shown in FIG. 14 is adopted, it is preferable to give the access right information 6 and 7 to employees as follows. Each of employees of the company X is given one piece of access right information 7 as a rule, and the access right information 7 is managed by the authentication server 3. However, an employee like a part-time worker who seldom moves among branch offices is not given the access right information 7. The image forming device 2 of each branch office manages the access right information 6 for each employee who belongs to the branch office. However, since the access right information 6 is used in an emergency like when the communication with the authentication server 3 is disabled, its setting specifics are preferably stricter than the setting specifics of the access right information 7. Alternatively, it is possible to share the access right information 6 among plural employees (among employees who belong to the same group, for example).

Alternatively, it is possible to set for each user which device performs the determination process with higher priority, the image forming device 2 or the authentication server 3. In other words, it is possible to set priority between the internal authentication and the external authentication. When the priority is changed or if exceptional authentication (the external authentication in the case shown in FIG. 10, while the internal authentication in the case shown in FIG. 12) is often performed, it is possible to display an editing screen for changing the setting specifics of the access right information 6 or 7 of the corresponding user. In these cases, it is considered that the user's environment (e.g., a branch office to which the user belongs or job specifics) has changed. Therefore, optimization of the access right information can be performed swiftly and easily by displaying the editing screen.

Although the determination of use permission or refusal of the image forming device 2 by an employee is performed in accordance with user authentication using a user ID and a password and determination whether or not use right of each function exists in this embodiment, other methods can be used for the determination. For example, an upper limit of the number of copies, the number of fax transmissions, the number of PC prints and the number of scan times are preset for each user, and the numbers are counted up for each user. Then, if the number exceeds the upper limit, execution of the process may be stopped.

It is preferable that a password that is sent from the image forming device 2 to the authentication server 3 is encrypted by using an existing encryption technique before transmission. For example, a password may be transformed into a hash value and sent to the authentication server 3. In this case, the authentication server 3 compares the received hash value with a hash value of the password indicated in the access right information 7 stored in the authentication server 3 itself, so as to perform the user authentication.

Furthermore, the structure of a whole or a part of the image forming device 1 and the authentication server 3, the process specifics, the process order, the table specifics, the user authentication method and the like can be modified if necessary in accordance with the spirit of the present invention.

The present invention can be used for reducing access right management of the image forming device, particularly in an organization having plural branch offices.

While example embodiments of the present invention have been shown and described, it will be understood that the present invention is not limited thereto, and that various changes and modifications may be made by those skilled in the art without departing from the scope of the invention as set forth in the appended claims and their equivalents.

What is claimed is:

1. An image processing device for performing an image-related process about an image, comprising:
   an access right information storage for storing first access right information which indicates permission of using one or more functions of the image processing device in the image processing device for each user;
   an access right information searching portion for searching in the access right information storage for first access right information of a user who wants to use the one or more functions of the image processing device;
   a use permission determining portion for determining whether or not use of the one or more functions of the image processing device should be permitted for the user in accordance with the first access right information of the user if the first access right information of the user is found by the access right information searching portion;
   an image-related process control portion for controlling the image processing device so that an image-related process of the image processing device designated by the user can be performed when the use permission determining portion produces a determination result indicating that the user can use the one or more functions of the image processing device;
   a determination request portion for requesting an authentication server via a network to act as the use permission determining portion if the first access right information does not allow the user to use the one or more functions of the image processing device, the authentication server storing second access right information, which indicates permission of use of the one or more functions of the image processing device in the image processing device for each user in accordance with the second access right information; and
   wherein, when the authentication server produces a determination result indicating that the user can use the image processing device for the one or more functions and the image processing device receives the determination result by the authentication server from the authentication server, the image-related process control portion controls the image processing device so that the image-related process of the image processing device designated by the user can be performed in accordance with the second access right information for the user.

2. The image processing device of claim 1, wherein
   the determination request portion requests the authentication server to act as the use permission determining portion only if the first access right information of the user is not found by the access right information searching portion.

3. The image processing device of claim 1, wherein the authentication server stores second access right information in addition to the first access right information stored in the access right information storage.

4. The image processing device of claim 1, wherein the first access right information and the second access right information are different for the user based on a user's environment.

5. An image processing device for performing an image-related process about an image, comprising:
   a use limitation information storage for storing first use limitation information for each user, the first use limitation information relating to limitation of using each function of the image processing device;
   a process specifics designation accepting portion for accepting designation of process specifics of the image-related process from a user;
   a use limitation information searching portion for searching in the first use limitation information storage for use limitation information of the user who designated the process specifics;
   a use permission determining portion for determining whether or not use of a function necessary for performing the image-related process of the designated process specifics should be permitted in accordance with the first use limitation information if the use limitation information is found by the use limitation information searching portion;
   a determination request portion for requesting an authentication server via a network to act as the use permission determining portion if the first use limitation information does not allow the user access to each function of the image processing device, the authentication server storing second use limitation information for each of the users; and
   an image-related process control portion for controlling each portion of the image processing device;
   wherein, when a determination result indicating that the use of the function necessary for performing the image-related process of the designated process specifics is permitted is produced by the authentication server and received by the image processing device, or produced by the use permission determining portion, the image-related process control portion controls each portion of the image processing device so that the image-related process of the designated process specifics can be performed in accordance with the second use limitation; and
   wherein, when a determination result indicating that the use of the function is not permitted is produced by the authentication server and received by the image processing device, or produced by the use permission determining portion, the image-related process control portion controls each portion of the image processing device to stop execution of the image-related process of the designated process specifics.

6. The image processing device of claim 5, wherein:
   the determination request portion requests the authentication server to act as the use permission determining portion only if the first use limitation information of the user is not found by the use limitation information searching portion.

7. The image processing device of claim 5, wherein the authentication server stores second use limitation information relating to limitation of using the image processing device in addition to the first use limitation information stored in the use limitation information storage.

8. The image processing device of claim 5, wherein the first use limitation information and the second use limitation information are different for the user based on a user's environment.

9. An image processing device for performing an image-related process about an image, comprising:
   an access right information storage for storing first access right information which indicates permission of using the image processing device in the image processing device for one or more functions in accordance with the first access right information for a user;
   a connection making portion for making connection with an authentication server via a network, the authentication server storing second access right information which indicates permission of using the image processing device in the image processing device for the one or more functions in accordance with the second access right information for the user;
   a determination request portion for requesting the authentication server to determine whether or not use of the image processing device for the one or more functions in accordance with the second access right information should be permitted for the user; and
   an image-related process control portion for controlling the image processing device so that an image-related process of the image processing device designated by the user can be performed when the determination request portion produces a determination result indicating that the user can use the image processing device for the one or more functions in accordance with the first access right information or the second access right information.

10. A method for controlling an image processing device that performs an image-related process about an image, the method comprising the steps of:
    preparing an authentication server that can be connected to the image processing device via a network;
    storing first access right information which indicates permission of using the image-related process in the image processing device for each user or each group including plural users;
    searching for the first access right information of a user who wants to use the image processing device to perform the image-related process;
    if the first access right information of the user is found as a result of the step for searching, determining whether use of the image-related process should be permitted for the user in accordance with the first access right information of the user, and allowing execution of the image-related process designated by the user when a determination result indicating that the user can use the image processing device is obtained from the first access right information;
    if the first access right information of the user is not found as a result of the step for searching, requesting the authentication server to determine, in place of the image processing device, whether the use of the image-related process should be permitted for the user in accordance with second access right information; and
    allowing execution of the image-related process designated by the user when a determination result indicating that the user can use the image processing device is obtained from the authentication server in accordance with the second access right information.

11. The method according to claim 10, further comprising a step for preparing the second access right information in the authentication server for each user or each group including plural users, wherein the authentication server determines whether the use of the image-related process should be permitted for the user in accordance with the second access right information of the user or a group to which the user belongs.

12. The method of claim 10, wherein
the requesting of the authentication server is performed only if the first access right information of the user is not found as a result of the step for searching.

13. The method of claim 10, wherein the authentication server stores second access right information in addition to the first access right information.

14. The method of claim 10, wherein the first access right information and the second access right information are different for the user based on a user's environment.

15. A method for controlling an image processing device that performs an image-related process about an image, the method comprising the steps of:
preparing an authentication server that can be connected to the image processing device via a network;
storing first access right information which indicates permission of using the image-related process in the image processing device;
making connection with the authentication server via the network;
if the connection with the authentication server succeeds in the step for making connection, requesting the authentication server to determine whether use of image-related process of the image processing device should be permitted for a user who wants to use the image processing device in accordance with second access right information in the authentication server for each user or each group including plural users, wherein the authentication server determines whether the use of the image-related process should be permitted for the user in accordance with the second access right information of the user or a group to which the user belongs; and
allowing execution of the image-related process designated by the user when a determination result indicating that the user can use the image-related process in the image processing device is obtained based on the first or second stored access right information.

16. The method according to claim 15, further comprising a step for preparing second access right information in the authentication server for each user or each group including plural users, wherein the authentication server determines whether the use of the image-related process in the image processing device should be permitted for the user in accordance with the second access right information of the user or a group to which the user belongs.

17. The method of claim 15, wherein
the determining based on the stored first access right information, in place of the authentication server, is performed only if the connection with the authentication server fails in the step for making connection.

18. A non-transitory computer-readable recording medium storing a computer program for use in an image processing device that performs an image-related process about an image and stores access right information which indicates permission of using the image processing device in the image processing device for each user or each group including plural users, the computer program making the image processing device execute the processes including:
a process for searching first access right information indicating permission of using the image processing device of a user who wants to use one or more functions of the image processing device, wherein the access right information is stored in the image processing device;
if the first access right information of the user is found as a result of the searching process, a process for determining whether use of the one or more functions of the image processing device should be permitted for the user in accordance with the first access right information of the user; and for controlling the image processing device so that the image-related process designated by the user can be performed when a determination result indicating that the user can use the image processing device is obtained from the first access right information stored in the image processing device; and
if the first access right information of the user is not found as a result of the process for searching, a process for requesting an authentication server, via a network to search for whether the use of the one or more functions of the image processing device should be permitted for the user in accordance with a second access right information; and
for controlling the image processing device so that the one or more functions of the image-related process designated by the user can be performed when a determination result indicating that the user can use the image processing device is obtained from the first access right information on the image processing device or the second access information from the authentication server.

19. The non-transitory computer-readable recording medium of claim 18, wherein
the process for requesting an authentication server to act for the process for determining is executed only if the first access right information of the user is not found as the result of the process for searching.

20. The non-transitory computer-readable recording medium according to claim 18, wherein the authentication server stores second access right information in addition to the first access right information stored in the image processing device.

21. A non-transitory computer-readable recording medium storing a computer program for use in an image processing device that performs an image-related process about an image and stores first access right information which indicates permission of using the image processing device for one or more functions in accordance with the first access right information for a user, the computer program making the image processing device execute the processes including:
a process for making connection with an authentication server via a network, the authentication server storing second access right information which indicates permission of using the image processing device for the one or more functions in accordance with the second access right information for a user;
a process for requesting the authentication server via a network to determine whether or not use of the image processing device should be permitted for a user who wants to use the image processing device if the connection with the authentication server succeeds in the process for making connection;
a process for determining whether or not the use of the image processing device should be permitted for the user based on the first access right information stored in the image processing device if information indicating a permission of use of the one or more functions of the image processing device for the user based on the second access right information is not obtained from the authentication server; and a process for controlling each portion of the image processing device so that the image-related process of the image processing device designated by the user can be performed when a determination result indicating that the user can use the image processing device for the one or more functions in accordance with the first access right information or the second right information is obtained.

22. The non-transitory computer-readable recording medium of claim 21, wherein the process for acting for determining whether or not the use of the image processing device should be permitted for the user only if the connection with the authentication server fails in the step for making connection.

\* \* \* \* \*